United States Patent
Buchholz et al.

(10) Patent No.: US 10,669,962 B2
(45) Date of Patent: Jun. 2, 2020

(54) METHOD AND DEVICE FOR PREDICTIVE OPEN-LOOP AND/OR CLOSED-LOOP CONTROL OF AN INTERNAL COMBUSTION ENGINE AND INTERNAL COMBUSTION ENGINE HAVING THE DEVICE FOR CARRYING OUT THE METHOD

(71) Applicant: MTU FRIEDRICHSHAFEN GMBH, Friedrichshafen (DE)

(72) Inventors: Michael Buchholz, Ulm (DE); Knut Graichen, Blaubeuren (DE); Karsten Harder, Langenau (DE); Jens Niemeyer, Friedrichshafen (DE); Jörg Remele, Hagnau (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 0 days.

(21) Appl. No.: 15/749,373

(22) PCT Filed: Oct. 10, 2016

(86) PCT No.: PCT/EP2016/001671
§ 371 (c)(1),
(2) Date: Jan. 31, 2018

(87) PCT Pub. No.: WO2017/102039
PCT Pub. Date: Jun. 22, 2017

(65) Prior Publication Data
US 2018/0216558 A1 Aug. 2, 2018

(30) Foreign Application Priority Data
Dec. 15, 2015 (DE) .................. 10 2015 225 279

(51) Int. Cl.
*F02D 41/14* (2006.01)
*F02D 41/30* (2006.01)
(Continued)

(52) U.S. Cl.
CPC ......... *F02D 41/1406* (2013.01); *F02D 37/02* (2013.01); *F02D 41/0027* (2013.01);
(Continued)

(58) Field of Classification Search
CPC ............... F02D 41/0047; F02D 41/005; F02D 41/0052; F02D 41/14; F02D 41/1406;
(Continued)

(56) References Cited

U.S. PATENT DOCUMENTS

| 7,035,834 B2 | 4/2006 | Jacobson |
| 2006/0137347 A1* | 6/2006 | Stewart .................. F02D 23/00 60/605.2 |

(Continued)

FOREIGN PATENT DOCUMENTS

| DE | 102011103594 A1 | 12/2011 |
| DE | 102011013481 A1 | 9/2012 |

(Continued)

OTHER PUBLICATIONS

David J. Kapparos et al: "Integration of Diesel Engine, Exhaust System, Engine Emissions and Aftertreatment Device Models", SAE Technical Paper Series, Bd. 1, Apr. 11, 2005 (Apr. 11, 2005), XP055329465, US ISSN: 0148-7191, DOI: 10.4271/2005-01-0947.

*Primary Examiner* — Jacob M Amick
*Assistant Examiner* — Michael A Kessler
(74) *Attorney, Agent, or Firm* — Lucas & Mercanti, LLP; Klaus P. Stoffel

(57) ABSTRACT

A method for predictive open-loop and/or closed-loop control of an internal combustion engine with control variables pursuant to a model of the engine with characterizing variables and a control circuit for the control variables. The control variables are adjusted in an open-loop or closed-loop manner by measuring actual values and specifying target values of the characterizing variables and, optionally, (Continued)

depending on the boundary and/or environmental and/or ageing conditions. The characterizing variables are controlled pursuant to a model of the engine with the characterizing variables and a control circuit with the control variables. The controlling is part of a model-based predictive control, wherein the characterizing variables of the engine model are calculated and the control variables of the engine are adjusted in a predictively controlled manner. A model-based predictive non-linear controller is used for the controlling, which is constructed in a modular manner with a number of model-based predictive control modules.

21 Claims, 9 Drawing Sheets

(51) Int. Cl.
F02D 41/00 (2006.01)
F02D 37/02 (2006.01)
(52) U.S. Cl.
CPC ..... F02D 41/0047 (2013.01); F02D 41/0087 (2013.01); F02D 41/146 (2013.01); F02D 41/1454 (2013.01); F02D 41/1466 (2013.01); F02D 41/30 (2013.01); F02D 41/0002 (2013.01); F02D 41/0082 (2013.01); F02D 2041/143 (2013.01); F02D 2041/1412 (2013.01); F02D 2041/1418 (2013.01); F02D 2041/1419 (2013.01); F02D 2041/1433 (2013.01); F02D 2250/12 (2013.01); Y02T 10/47 (2013.01)

(58) Field of Classification Search
CPC ............... F02D 41/1454; F02D 41/146; F02D 41/1466; F02D 41/1473; F02D 41/1477; F02D 41/26; F02D 41/30; F02D 37/00; F02D 37/02; F02D 43/00; F02D 2041/1401; F02D 2041/1405; F02D 2041/1412; F02D 2041/1415; F02D 2041/1416; F02D 2041/1418; F02D 2041/1419; F02D 2041/143; F02D 2041/1433; F02D 2250/12; F02D 35/026; Y02T 10/44; Y02T 10/47; F01N 9/005
See application file for complete search history.

(56) References Cited

U.S. PATENT DOCUMENTS

| | | | |
|---|---|---|---|
| 2008/0022958 A1* | 1/2008 | I .......................... | F02D 41/0002 123/179.3 |
| 2011/0172897 A1 | 7/2011 | Tsuzuki | |
| 2012/0173118 A1* | 7/2012 | Wang .................. | F02D 41/0002 701/102 |
| 2013/0067894 A1 | 3/2013 | Stewart | |
| 2014/0209065 A1* | 7/2014 | Boog .................. | F02M 55/025 123/456 |
| 2016/0146130 A1* | 5/2016 | Haskara ............... | F02D 41/005 701/108 |

FOREIGN PATENT DOCUMENTS

| | | |
|---|---|---|
| EP | 1363005 A2 | 11/2003 |
| EP | 1864012 B1 | 10/2010 |
| WO | 2009112056 A1 | 9/2009 |

* cited by examiner

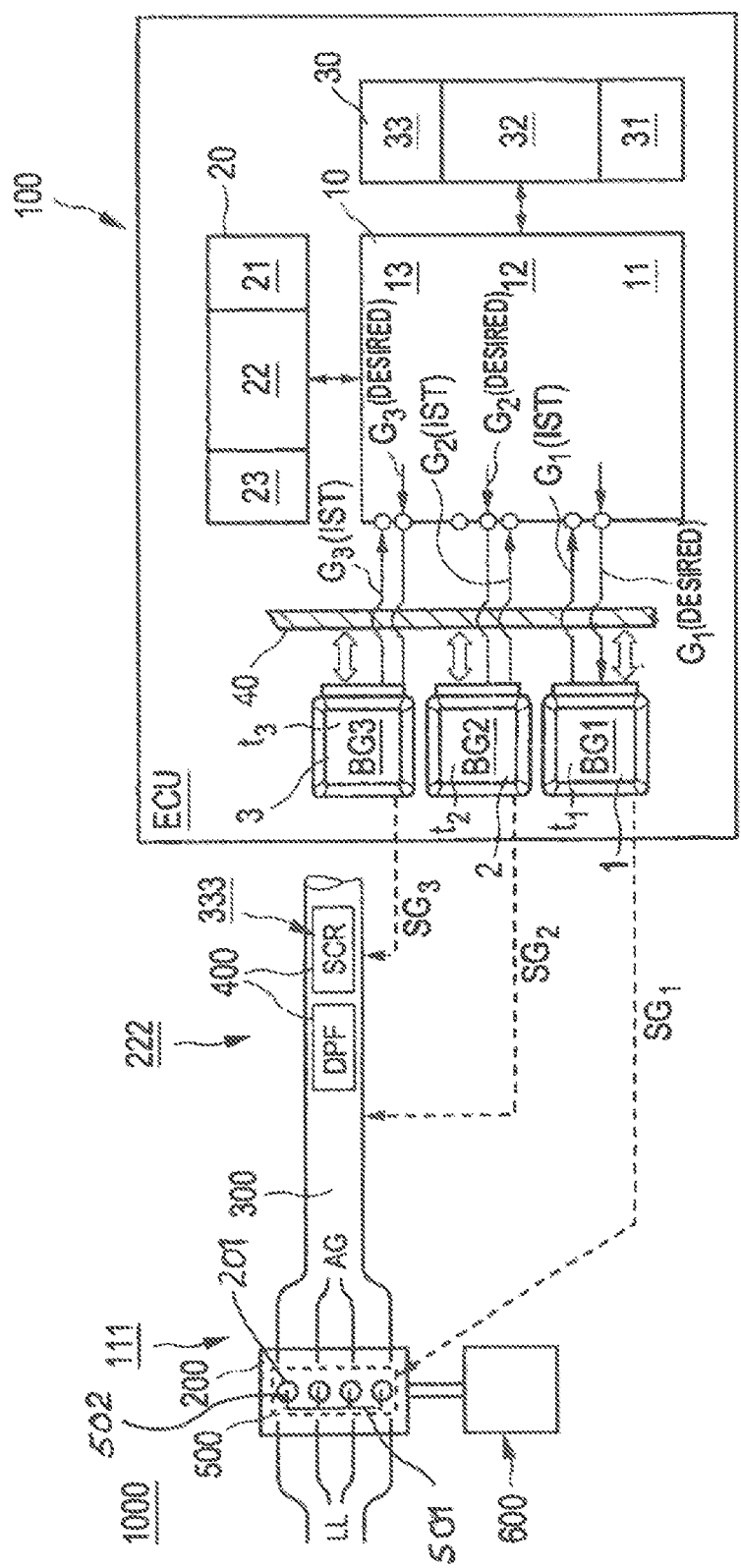
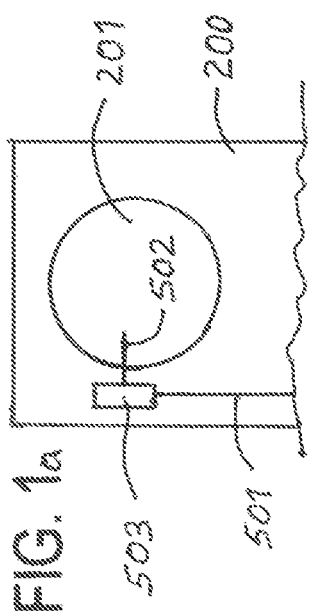
FIG. 1
FIG. 1a

- States $x = [agr, \lambda, \hat{T}_{10}]^T$
- Measuring variables $\xi = [n_{mot}, T_0, P_0, L_0, T_5, P_{10}, T_{10}]^T$ (No prediction in contrast to states)
- Desired variables/barriers $w = [M^{Desired}, NO_x^{Desired}, pT^{Desired}, p_{max}^{max}, n_{ATL,HD}^{max}, n_{ATL,ND}^{max}, T_7^{Desired}, T_{10}^{min}, T_{10}^{max}]^T$
- Control variables MPC engine $u = [Agr^{Desired}, \lambda^{Desired}, BOI, m_{ks}, p_{rail}]^T$
- Stellgrößenbeschränkungen: Minimum $\underline{u} = [\underline{Agr}^{Desired}, \underline{\lambda}^{Desired}, \underline{BOI}, \underline{m}_{ks}, \underline{p}_{rail}]^T$
  Maximum $\overline{u} = [\overline{Agr}^{Desired}, \overline{\lambda}^{Desired}, \overline{BOI}, \overline{m}_{ks}, \overline{p}_{rail}]^T$
- Parameter $p = [\Gamma_1, \Gamma_2, \tau_1, \tau_2, \tau_3, K_3, K_4, K_5, \tau_5]^T$ (Weighting $\Gamma_j$ for the closed-loop controller parameterization and adaptation variables $\tau_j, K_j$ from parameter estimations for for compensating model deviations

FIG. 5

*Example thermomanagement for engine without SCR:*
MPC engine calculates control variable by means of approximative solution of the optimization problem $$\min_{\underline{u} \leq u \leq \overline{u}} \int_{t}^{t+T_1} \Gamma_1 \left( \hat{M}(x, u, \xi) - M^{desired} \right)^2 + d\tau$$

s.t. $\dot{agr} = \frac{1}{\tau_1}(agr^{desired} - agr)$, $agr(t) = agr^{actual}$ $\dot{\lambda} = \frac{1}{\tau_2}(\lambda^{desired} - \lambda)$, $\lambda(t) = \lambda^{actual}$ $\dot{T}_{10} = \frac{1}{\tau_3}(K_3 \hat{T}_7(x, u, \xi) - \hat{T}_{10})$, $\hat{T}_{10}(t) = T_{10}^{actual}$ $\dot{NO}_x(x, u, \xi) = K_4 NO_x^{desired}$, $\hat{PT}(x, u, \xi) = PT_k^{desired}$, $T_{10}^{min} \leq \hat{T}_{10}(x, u, \xi) \leq T_{10}^{max}$ $\hat{p}_{max}(x, u, \xi) \leq p_{max}^{max}$, $\hat{n}_{ATL,HD}^{max}(x, u, \xi) \leq n_{ATL,HD}^{max}$, $\hat{n}_{ATL,ND}^{max}(x, u, \xi) \leq n_{ATL,ND}^{max}$ > Difference with respect to the normal operation: DPF is too cold therefore its temperature must be raised to the minimum value. The consumption optimality is omitted since this comprises a conflicting interest (according to the thermomanagement system, the consumption reduces inter alia which cannot be represented by the independent models.)

FIG. 6A

*Example coupling with superordinate "MPC AGN" for engine having SCR:*
MPC engine calculates control variable by means of approximate solution of the optimization problem > Difference with respect to normal operation: all the temperature effects are observed in "MPC AGN" with the longer prediction horizon and are therefore excluded.
> $T_7^{desired}$ and $NO_x^{max}$ are interfaces of the two MPC blocks in order to achieve the superordinate targets that occur on the longer timescale. In other words without it being clear to see in "MPC engine" a superordinate target is achieved by means of the superordinate instant "MPC AGN", minimizing the operating costs (in other words AdBlue&Diesel). For this purpose the SCR is utilized as the new degree of freedom with which it is possible to change the limits of the NOx emissions $NO_x^{desired}$ that are generated by the engine.
> However, for this purpose the SCR requires $T_7^{desired}$ $$\min_{\underline{u} \leq u \leq \overline{u}} \int_t^{t+T_1} \Gamma_1 (M(x, u, \xi) - M^{desired})^2 + \Gamma_2 b\ddot{e}ff^2(x, u, \xi) d\tau$$

s.t. $\dot{agr} = \frac{1}{\tau_1}(agr^{desired} - agr), \ agr(t) = agr^{actual}$ $\dot{\lambda} = \frac{1}{\tau_2}(\lambda^{desired} - \lambda), \ \lambda(t) = \lambda^{actual}$ $\dot{NO}_x(x, u, \xi) = NO_{x, vor SCR}^{desired}, \ \dot{PT}(x, u, \xi) = PT_x^{desired}, \ \dot{T}_7(x, u, \xi) = T_7^{desired}$ $p_{max}^{max}(x, u, \xi) \leq p_{max}^{max}, \ \dot{n}_{ATL,HD}^{max}(x, u, \xi) \leq n_{ATL,HD}^{max}, \ \dot{n}_{ATL,ND}^{max}(x, u, \xi) \leq n_{ATL,ND}^{max}$

FIG. 6B

- States $x = [\hat{T}_{10}, \hat{T}_{SCR}]^T$

- Measuring variables $\xi = [n_{mot}, T_0, p_0, L_0, T_5, p_{10}, T_{10}, T_{SCR}]^T$ (No prediction in contrast to states)

- Control variables/limitations $w = [M^{desired}, NO_x^{desired\ after\ SCR}, PT^{desired}, p_{max}^{max}, n_{ATL,HD}^{max}, T_{SCR}^{min}, T_{SCR}^{max}, T_{10}^{min}]^T$

- Control variables MPC engine $u = [agr^{desired}, \lambda^{desired}, BOI, m_{ks}, p_{rail}]^T$

- Control variable limitations:  Minimum $\underline{u} = [agr^{desired}, \lambda^{desired}, \underline{BOI}, \underline{m}_{ks}, \underline{p}_{rail}]^T$
  Maximum $\overline{u} = [\overline{agr}^{desired}, \overline{\lambda}^{desired}, \overline{BOI}, \overline{m}_{ks}, \overline{p}_{rail}]^T$

- Parameter $p = [K_5, \tau_5, K_6]^T$ (Weighting $\Gamma_i$ and adaptation variables $\tau_i, K_i$)

- On this timescale gas path is evaluated in a static manner in other words polynomials are evaluated with $agr^{desired}, \lambda^{desired}$

- MPC AGN approx.
  Solution $\min_{\underline{u} \leq u \leq \overline{u}} \int_t^{t+T_2} \Gamma_1(M(x,u,\xi) - M^{desired})^2 + \Gamma_3 \dot{m}_{br}(u,\xi) + \Gamma_4 \dot{m}_{ad}(x,u,\xi) d\tau$ ($T_2$ horizon length (=temperature time constants))
  (Normal operation)
  s.t. $\dot{\hat{T}}_{10} = \frac{1}{\tau_3}(K_3\hat{T}_7(u,\xi) - \hat{T}_{10})$, $\hat{T}_{10}(0) = T_{10}^{actual}$
  $\dot{\hat{T}}_{SCR} = \frac{1}{\tau_5}(K_5\hat{T}_{10} - \hat{T}_{SCR})$, $\hat{T}_{SCR}(0) = T_{SCR}^{actual}$
  $(1 - \eta_{SCR}(T_{SCR}, \dot{m}_{Exhaust}(u,\xi)))NO_{x,beforeSCR}(u,\xi) = K_8 NO_{x,afterSCR}^{desired}, PT(u,\xi) = PT^{desired}, T_x^{min} \leq T_{SCR} \leq T_{SCR}^{max}$
  $p_{max}(u,\xi) \leq p_{max}^{max}, n_{ATL,HD}(u,\xi) \leq n_{ATL,HD}^{max}$
  $\dot{m}_{max}(u,\xi) \leq \dot{m}_{max}^{max}, n_{ATL,ND}(u,\xi) \leq n_{ATL,ND}^{max}$

- Control variables are internal variables, for the plausibility check

- Results $\hat{T}_7(u,\xi), \dot{NO}_{x,beforeSCR}(u,\xi)$ are relayed to subordinated block "engine MPC" as desired values
  $\hat{T}_7^{soll}, \dot{NO}_{x,beforeSCR}$

FIG. 6C

METHOD AND DEVICE FOR PREDICTIVE OPEN-LOOP AND/OR CLOSED-LOOP CONTROL OF AN INTERNAL COMBUSTION ENGINE AND INTERNAL COMBUSTION ENGINE HAVING THE DEVICE FOR CARRYING OUT THE METHOD

The present application is a 371 of International application PCT/EP2016/001671, filed Oct. 10, 2016, which claims priority of DE 10 2015 225 279.5, filed Dec. 15, 2015, the priority of these applications is hereby claimed and these applications are incorporated herein by reference.

BACKGROUND OF THE INVENTION

The invention relates to a method for predictive open-loop and/or closed-loop control of an internal combustion engine using control variables according to a model of the internal combustion engine, said model having characterizing variables, and according to a closed-loop control circuit for the control variables, wherein in the method, the control variables of the internal combustion engine are set in an open-loop controlled or a closed-loop controlled manner and the method comprises the following steps:

measuring actual values and specifying desired values of the characterizing variables of the internal combustion engine, and also optionally in dependence upon boundary conditions and/or environmental conditions and/or aging conditions. The invention also specifies a device for predictive open-loop control and/or closed-loop control of the internal combustion engine, said device being embodied for implementing the method. Furthermore, the invention specifies to an internal combustion engine having the device for predictive open-loop and/or closed-loop control of the internal combustion engine.

The closed-loop control of characterizing variables can be performed according to a model of the internal combustion engine, said model having the characterizing variables, and according to a closed-loop control circuit having the control variables, wherein the closed-loop control is performed within the scope of a model-based predictive closed-loop control in which the characterizing variables of the model of the internal combustion engine are calculated and the control variables of the internal combustion engine are set in a predictive closed-loop controlled manner. Predictive closed-loop control concepts are associated with the class of the model-based closed-loop control methods and generally render it possible to make a prediction in the future for the closed-loop control circuit, namely for a so-called prediction horizon. Such predictive closed-loop control concepts have proven reliable since they render it possible within the scope of the prediction of the system behavior to achieve an optimized closed-loop control; this can already take into account information regarding future operating behavior of the system. This has the result that desired value specifications and also boundary conditions for a closed-loop control circuit can be set and/or maintained in an optimized manner. Altogether, as a consequence it is possible to achieve improved closed-loop control quality and/or a more rapid closed-loop control procedure. It is possible to define more complex closed-loop control targets and systematically to take into account limitations in control variables or physical variables of the system.

However, in the case of such predictive closed-loop control concepts and other predictive closed-loop control concepts, the comparatively complex computing outlay is regularly problematic with the result that predictive closed-loop control concepts have hitherto only been offered for part components of an engine of an internal combustion engine. The embodiment of a suitable model of the part component of an engine is significant for the success of a predictive closed-loop control concept. Hitherto, it was in particular not possible to realize optimized predictive closed-loop control concepts in real time on an engine control unit for the global open-loop control and closed-loop control of the entire internal combustion engine, for example also taking into account a component of an exhaust gas aftertreatment having suitable quality requirements for the closed-loop control and in real time.

To the extent that predictive closed-loop control concepts are known for diesel engines, these are limited to greatly simplified models of a system, in other words in particular to only linearized system models that moreover are embodied in a static manner or only with insufficient timescales, in particular process times and/or process scales. Moreover, hitherto known predictive closed-loop control concepts do not take into account sufficient boundary conditions—hitherto sufficient use of characteristic diagram structures has not been made. This results in both a comparatively large outlay for extracting parameters of the characteristic diagrams as well as to these closed-loop control concepts being comparatively inflexible, for example if the internal combustion engine is changed or the environmental conditions are changed. For this reason, greatly linearized models that are based on characteristic diagram factors and correcting factors and are used for predictive closed-loop control approaches do not render possible optimal operation of the entire system of an internal combustion engine, in particular a diesel engine.

Closed-loop control concepts such as by way of example those disclosed in DE 10 2011 013 481 A1 and EP 1 864 012 B1 suffer from such disadvantages and other disadvantages.

DE 10 2011 013 481 A1 thus is only limited to a part aspect of a diesel engine; namely an actuator of the internal combustion engine in which the actuator is set in dependence upon the entire gas mass, the oxygen content, the desired entire gas mass and the desired oxygen content. Such a stark reduction in the number of actuators is not appropriate for the holistic (global) predictive closed-loop control approach for the entire internal combustion engine.

EP 1 864 012 B1 relates to a multivariable model-predictive closed-loop controller for fuel- and/or air-related parameters taking into account a central optimizing algorithm that functions with state limitations and/or actuator limitations. Moreover, the excessive use in this case of characteristic diagram structures is disadvantageous for the closed-loop control concept.

It would be desirable to provide a holistic model-based predictive closed-loop control of an internal combustion engine that renders it possible to control in a closed-loop manner the entire internal combustion engine, preferably in a global manner, in particular taking into account components of an exhaust gas aftertreatment within the scope of a model-based predictive closed-loop control in real time on an engine control unit (ECU). The predictive closed-loop control concept should take into account the non-linearities of the system of the internal combustion engine or the model of the internal combustion engine. Hitherto non-linear model-predictive closed-loop controllers have proven to be incapable of functioning in real time on an engine control unit (ECU) for an entire model of an internal combustion engine owing to their being comparatively very complex.

The above mentioned greatly simplified models are however not practicable, at least not globally over the entire operating range.

SUMMARY OF THE INVENTION

This is the point at which the invention steps in, the object of said invention being to provide a method for predictive open-loop control and/or closed-loop control of an internal combustion engine using control variables according to a model of the internal combustion engine, said model having characterizing variables, and according to a closed-loop control circuit for the control variables, or according to the direct control of the control variables, wherein the characterizing variables of the model of the internal combustion engine can occur in real time on an engine control unit for the entire internal combustion engine (globally) within the scope of a non-linear model-based predictive closed-loop control. It is also the object of the invention to provide a corresponding device for predictive open-loop and closed-loop control and also an internal combustion engine having the device.

In relation to the method, the object is achieved by a method in which the characterizing variables are controlled in a closed-loop manner according to a model of the internal combustion engine, said model having the characterizing variables, and according to a closed-loop control circuit having the control variables, wherein the closed-loop control is performed within the scope of a model-based predictive closed-loop control in which the characterizing variables of the model of the internal combustion engine are calculated and the control variables of the internal combustion engine are set in a predictive closed-loop control manner, a model-based predictive non-linear closed-loop controller is used for the closed-loop control, said controller being constructed in a modular manner using a number of model-based predictive closed-loop control modules, wherein at least one first model-based predictive closed-loop control module is allocated a first timescale, in particular a more rapid process time and/or shorter process scale, and at least one second, preferably model-based predictive closed-loop control module is allocated a second timescale, in particular a slower process time and/or longer process scale, wherein the at least one first and at least one second timescale, in particular process time and/or process scale, are different.

The concept of the invention provides, to solve the object relating to an apparatus, also a device for predictive open-loop control and/or closed-loop control of the internal combustion engine and also to an internal combustion engine.

The invention is based on the consideration that hitherto it has not been possible to realize an optimal operation of an entire closed-loop control system for an internal combustion engine in real time on an engine control unit (ECU) since either model-based predictive closed-loop control concepts are insufficient as a result of great simplifications and/or linearizations or rather said concepts are too inflexible regarding the use of characteristic diagrams and correcting factors; theoretically fundamentally known model-predictive closed-loop controllers have proven for an entire model to be incapable of functioning in real time—without the above-mentioned great simplifications or limitations.

The invention is further based on the consideration that taking into account the available computing power of closed-loop controllers and engine control units (ECU), it is nevertheless possible to achieve a real time capability if you take into account the timescales, in particular process times and/or process scales, which are significant in the entire system of an internal combustion engine. The invention has identified based on these considerations that processes that run at different rates and/or different lengths of time are present in the entire system of an internal combustion engine. Based upon this knowledge, the concept of this invention proposes to modularize the entire system of the internal combustion engine or the model of the internal combustion engine with regard to the different timescales, in particular process times and/or process scales of individual procedures, preferably to stagger the modules chronologically with regard to the timescales.

Based upon this knowledge, the invention therefore proposes a model-based predictive non-linear closed-loop controller that is nevertheless capable of functioning in real time on an engine control device since this is constructed in a modular manner using a number of closed-loop control modules, in particular using a number of model-based predictive closed-loop control modules, wherein at least one first model-based predictive closed-loop control module is allocated a first timescale, in particular a more rapid process time and/or shorter process scale, and at least one second, preferably model-based predictive closed-loop control module is allocated a second timescale, in particular a slower process time and/or longer process scale, wherein the at least one first and at least one second timescale, in particular process time and/or process scale are different.

Preferably it is provided that for calculation purposes, the characterizing variables of a global model of the internal combustion engine are calculated in real time on an engine control unit (ECU) for the entire internal combustion engine within the scope of a non-linear model-based predictive closed-loop control, and/or on the basis of the global model of the internal combustion engine, in particular the engine, desired values and control variables are determined for the first and/or second closed-loop control module, said desired values and control variables being adjusted to a prevailing operating situation in terms of a measure of quality.

Moreover, a further development has identified that the entire system of an internal combustion engine or a model of the internal combustion engine can be described by taking into account the relevant processes in any case by way of a first model-based predictive closed-loop control module having a first timescale, in particular process time and/or process scale, and by way of a second model-based predictive closed-loop control module having a second timescale, in particular process time and/or process scale, wherein the first and second timescale, in particular the first and second process time and/or process scale are different. In particular, the invention has identified that for the first timescale, a more rapid process time or shorter process scale is relevant and for the second timescale a second slower process time or longer process scale is relevant.

As a preferred further development, the invention proposes for an internal combustion engine modularizing into part components or into part models, wherein the internal combustion engine comprises one or multiple of the following components:

(i) an engine that comprises a number of cylinders, in particular said engine having a combustion component that takes place comparatively rapidly, (ii) in particular an injection system that comprises a common rail, said injection system having a number of injectors that are allocated to the cylinders, wherein an individual reservoir is allocated to an injector, said reservoir being provided so as to be charged with fuel from the common rail for the injector, in particular having an injection process component that takes place comparatively rapidly, or (iii) in particular a gas mixer and an ignition timing sensor, preferably for a gas engine, (iv) a gas and exhaust gas system, in particular an exhaust gas recirculation system, having a gas and an exhaust gas path, preferably having a component of the gas and exhaust gas path that takes place on mid-range timescale and at mid-range speed namely by way of example having a component of the significant mass flows that takes place at a comparatively mid-range rate or rather at a comparatively slower rate, (v) an exhaust gas aftertreatment, in particular having a catalytic converter, preferably for a component that takes place comparatively slowly of a process by way of example a first slow timescale of temperature changes in the exhaust gas aftertreatment or a second slow timescale of aging processes.

The above-mentioned components having timescales of a (roughly) high rate (i) and mid-to-high rate (ii, iii), mid-range rate (iv) and the components with the above-mentioned rather slower running times (v) are found approximately at a process time and/or process scale of milliseconds (rapid), or seconds (mid-range), or minutes or hours or longer (slow).

Within the scope of a particularly preferred further development, it is provided that the characterizing variables of the first closed-loop control module for the model of the internal combustion engine are calculated in the first model-based predictive closed-loop control module in dependence upon the calculation of characterizing variables of the second closed-loop control module for the model of the internal combustion engine in the second, preferably model-based predictive, closed-loop control module. The predominantly initially independent calculation in the first and second closed-loop control module and also where appropriate further closed-loop control modules is ensured finally owing to the timescale separation and the different timescales that are identified by the invention, in particular process times and/or process scales of the system components, such as in particular the engine-based combustion, the injection system-based injection processes, the gas path-based gas movement and/or the temperature and aging developments in the exhaust gas aftertreatment system or catalytic converter or particulate filter system. A dependency is nevertheless present and is taken into account preferably by means of couplings or the like. Within the scope of a particularly preferred further development it is thus provided that the characterizing variables of the first closed-loop control module for the model of the internal combustion engine are calculated in the first model-based predictive closed-loop control module of a first timescale, in particular a more rapid process time and/or shorter process scale, according to calculated characterizing variables of the second closed-loop control module for the model of the internal combustion engine in the second, preferably model-based predictive closed-loop control module of a second timescale, in particular slower process time and/or longer process scale. This further development uses the fact that rapidly running processes of a rapid system component can take into account the specifications of the slow running system component as "quasi-static" boundary conditions. This reduces coupling effects realistically to the required effects and limits the degrees of freedom of each part module in a likewise realistic manner. This can go hand-in-hand with a reduction in the number of control variables—namely by means of dividing the same to the closed-loop control modules that however is realistic owing to the timescale separation and contributes to the real time capability of the entire predictive closed-loop control approach.

It is preferred that, in particular for engine management that:

the first model-based predictive closed-loop control module of the first timescale, in particular a more rapid process time and/or shorter process scale, is a closed-loop control module for the engine that comprises a number of cylinders, in particular wherein combustion-characterizing variables of the engine are calculated. Variables of a combustion, namely a NOx and/or soot value, and/or characterizing variables, namely a Lambda value and/or an exhaust gas recirculation rate, are preferably calculated for the engine management.

It is preferred, in particular for injection management, that:

the first model-based predictive closed-loop control module of the first timescale, in particular more rapid process time and/or shorter process scale, comprises a closed-loop control module for the injection system that comprises a common rail, said injection system having a number of injectors that are allocated to the cylinders, wherein an individual reservoir is allocated to an injector, said reservoir being provided so as to be charged with fuel from the common rail for the injector, wherein injection-characterizing variables of the injection system are calculated. It is preferred that a start of an injection procedure (BOI), an end of an injection procedure (SE) and/or a rail pressure (p-Rail) are calculated for the injection management. An ignition point in time and/or a gas mass are preferably calculated for a gas engine.

It is preferred, in particular for gas and exhaust gas recirculation management that:

a closed-loop control module for the gas and exhaust gas recirculation having a gas and exhaust gas path is subordinated in a chronologically staggered manner to the first model-based predictive closed-loop control module of the first timescale, in particular a more rapid process time and/or shorter process scale, and/or is combined with said first model-based predictive closed-loop control module, wherein a third timescale, in particular a mid-range process time and/or a medium to short process scale is allocated to said model-based predictive closed-loop control module for the gas and exhaust gas recirculation, wherein gas and exhaust gas path-characterizing variables of the gas and exhaust gas recirculation are calculated. Variables of an exhaust gas recirculation are preferably calculated for the for the gas and exhaust gas recirculation management, in particular an exhaust gas recirculation rate (AGN), one or multiple throttle valves (position DK), one or multiple dispenser valves (position SK) and/or one or multiple turbine bypasses (rate TP) are calculated.

It is preferred, in particular for exhaust gas aftertreatment management, that the second model-based predictive closed-loop control module of the second timescale, in particular the slower process time and/or longer process scale, is a closed-loop control module for the exhaust gas aftertreatment (AGN), in particular having a catalytic converter, wherein exhaust gas aftertreatment-characterizing variables of the exhaust gas aftertreatment, in particular having a catalytic converter, are calculated, in particular an exhaust gas temperature and/or catalytic converter temperature, a warming up/cooling down rate and/or a conversion rate.

Variables of the exhaust gas aftertreatment, namely a gas and/or exhaust gas temperature, in particular an emissions value of nitrogen oxide, or other emissions values of a catalytic converters are preferably predetermined for the first closed-loop control module, in particular as a result of the different timescales, in particular process times and/or process scales.

Within the scope of a further development the modularization renders possible that in the first model-based predictive closed-loop control module, in particular in dependence upon the second, preferably model-based predictive closed-loop control module the following are taken into account:
boundary and/or environmental and/or aging conditions, of the characterizing variables of the internal combustion engine, and/or
actual values and desired values of the characterizing variables of the internal combustion engine, and/or
estimations by non-linear observers, and/or
an optimization algorithm.

It is preferably provided that the characterizing variables of the model of the internal combustion engine of the second, preferably model-based predictive closed-loop control module of a second timescale, in particular a slower process time and/or longer process scale, are calculated in a dynamic manner and the characterizing variables of the model of the internal combustion engine of the first model-based predictive closed-loop control module of a first timescale, in particular a more rapid process time and/or shorter process scale are calculated in a static manner.

The combustion process can be calculated by way of example from work cycle to work cycle using a stationary model without dynamic proportions. When calculating the gas path, it is possible by way of example to take into account the dynamics of the valves and turbocharger. In order to better utilize the computing power, it is particularly preferred to implement a calculating process of a predictive non-linear closed-loop controller of the combustion in a more rapid cycle time or with an increased sampling rate of a desired/actual value comparison, in other words to convert to a more rapid timescale and the calculating process of the gas path can be calculated using its rather complex dynamics in a slower cycle time, in other words can be converted to a longer timescale.

In particular, it is advantageously provided that the static calculation is performed by means of non-linear polynomials and the dynamic calculation is performed by means of a differential equation model, in particular of a dynamic model by means of differential equations.

In order to reduce the complexity of the calculations, it is also possible to reproduce the dynamic behavior of a component, which is controlled in a closed-loop manner, by means of a dynamic model that combines the temporal behavior of the closed-loop controller and part components to a model for the behavior of the component that is controlled in a closed-loop manner. The control variables of the component can then be calculated by means of the classic closed-loop controller that is advantageously used there. The superimposed closed-loop control module can then provide desired values for the closed-loop controlled part system. Superimposed calculations are simplified since the control variables of this part component are not determined by means of a superimposed optimization of the closed-loop controller but rather within the part component.

In a particularly advantageous manner, the allocation of different process times and/or process scales includes that the first timescale, in particular a more rapid process time and/or shorter process scale, and/or the second timescale, in particular a slower process time and/or longer process scale, is significant for setting a temporal closed-loop control in accordance with one of the parameters that are selected from the group including: a timescale of a closed-loop control time period, a time step of a closed-loop control interval, a sampling rate of a desired/actual value comparison, a computing cycle time of a closed-loop controller and other calculation rates, a prediction horizon. In this manner, the course of time of the respective system component with regard to the rate and duration per time clocking and timescale and the further mentioned parameter of the closed-loop control can be appropriately taken into account and nevertheless a real time capability can be ensured on an engine control unit.

Embodiments of the invention are described below with reference to the drawing. This drawing is not necessarily intended to illustrate the embodiments to scale, on the contrary the drawing is provided in a schematic and/or slightly distorted form where it is beneficial to the explanation. With regard to the amendments of the doctrine that is directly evident in the drawing, reference is made to the relevant prior art. It is to be taken into account here that diverse modifications and alterations relating to the form and the detail of an embodiment can be performed without departing from the general idea of the invention. The features of the invention that are disclosed in the description, in the drawing and also in the claims can be present both individually as well as in any combination for the development of the invention. Moreover, all combinations of at least two of the features that are disclosed in the description, the drawing and/or the claims fall within the scope of the invention. The general idea of the invention is not limited to the exact form or the detail in the following illustrated and described preferred embodiments or Limited to a subject manner that would be limited in comparison to the subject matter disclosed in the claims. In the case of disclosed measuring ranges, values that lie within the mentioned boundaries are also intended to be disclosed as boundary values. For the purpose of simplicity, hereinunder identical reference numerals are used for identical or similar parts or parts with identical or similar functions.

Further advantages, features and details of the invention are apparent from the following description of the preferred embodiments and also with reference to the drawing; in the drawing

BRIEF DESCRIPTION OF THE DRAWING

FIG. 1 illustrates schematically an internal combustion engine having a device for predictive open-loop and/or closed-loop control of the internal combustion engine and its predictive closed-loop controller is modularized in accordance with a preferred timescale separation;

FIG. 1a is an enlarged view of a portion of the internal combustion engine shown in FIG. 1.

FIG. 5 illustrates a list of states (characterizing variables), measuring variables and also further desired variables and/or barriers for characterizing variables (boundary conditions), control variables and control variable limitations (boundary conditions) for an exemplary closed-loop control description of a predictive model-based non-linear closed-loop control of an internal combustion engine;

FIG. 6A illustrates an example of a measure of quality of a non-linear model-based predictive closed-loop control description for a suitable closed-loop control module relating to the exhaust gas aftertreatment (SCR)

FIG. 6B illustrates an example of a coupling of the closed-loop control description of FIG. 6A with a superimposed model-based predictive closed-loop control module of the engine in FIG. 6;

FIG. 6C illustrates the example of a closed-loop control description for a model-based predictive closed-loop control approach for an engine having an exhaust gas aftertreatment viewed in a holistic manner.

DETAILED DESCRIPTION OF THE INVENTION

Figure 2:
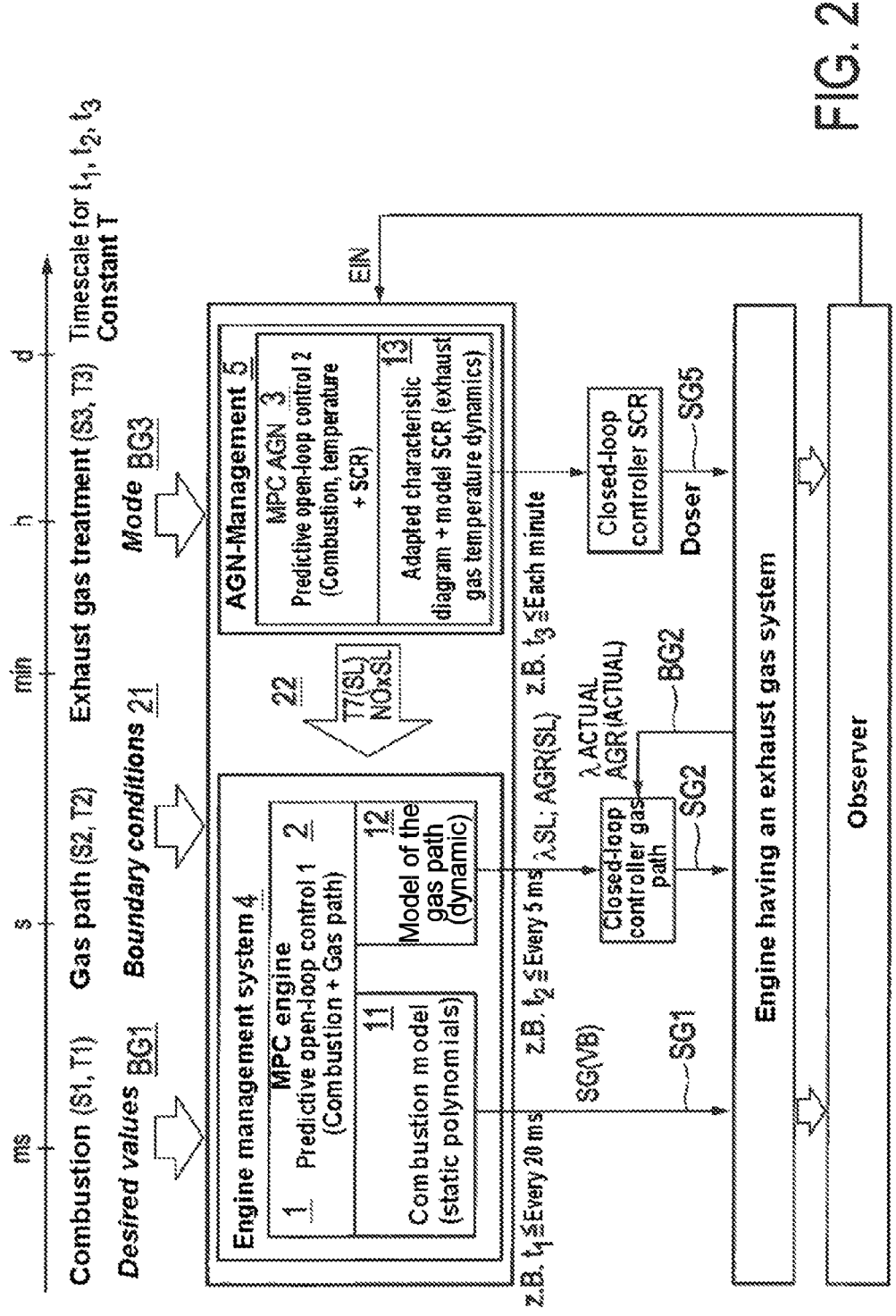
FIG. 2 illustrates schematically the timescale separation that is illustrated in FIG. 1, wherein preferred predictive closed-loop control modules of the device are chronologically staggered for the predictive open-loop and/or closed-loop control.

FIG. 1 illustrates schematically the construction of an internal combustion engine 1000 having a device 100 for predictive open-loop and/or closed-loop control of the internal combustion engine 1000. In the case of the embodiment in accordance with the concept of the invention, the device 100 is provided as an engine control unit ECU and is capable of providing model-based predictive open-loop and/or closed-loop control of the entire internal combustion engine 1000 in a holistic (global) manner. The device 100 comprises within the scope of a non-linear model-based predictive closed-loop control approach a model 10 of the internal combustion engine, said model here having characterizing variables Gi, (i=1, 2, 3) and a closed-loop control circuit here for control variables SGi (i=1, 2, 3).

The model 10 is modularized and comprises, for a number of model-based predictive non-linear closed-loop control modules 1, 2, 3, corresponding model-based predictive closed-loop controllers 11, 12, 13 in the model 10. The model 10 is implemented in the form of optimizing algorithms and is supported by means of providing suitable boundary conditions, environmental conditions or aging conditions of the characterizing variables Gi of the internal combustion engine; namely by means of the conditions 20 or estimations by means of non-linear observers 30. The conditions can also be modularized according to the closed-loop control modules 1, 2, 3 and the predictive closed-loop controllers 11, 12, 13 that are subordinated therein in accordance with the—as is illustrated in FIG. 1—distribution of the conditions 20 into modularized condition specifications 21, 22, 23 or modularized observers 31, 32, 33 of the observer system 30.

The basis of the construction of the model 10 having a number of model-based predictive closed-loop control modules 1, 2, 3 is the separation of timescales in this case with process times t1, t2, t3 (in FIG. 2 also timescales Si and time constants Ti, (i=1, 2, 3)) for components of the internal combustion engine 1000 that run at different rates or the processes in these components.

A first predictive model-based closed-loop control module 1 is thus allocated a first more rapid process time t1 on a comparatively shorter timescale, a second model-based predictive closed-loop control module 2 is allocated a mid-range process time t2 on a mid-range timescale and a third model-based predictive closed-loop control module 3 is allocated a slower process time t3 on a longer timescale.

Each of the closed-loop control modules 1, 2, 3 calculates characterizing variables G1, G2, G3 within the scope of the modularized predictive closed-loop control 11, 12, 13 taking into account a measure of quality. If desired values of a subordinated closed-loop controller are determined, these desired and actual values of the characterizing variables Gi-ACTUAL or Gi-DESIRED; (i=1, 2, 3) are aligned with one another. In other cases, control variables are output directly from the closed-loop control module for the corresponding actuators. A predictive calculation of corresponding characterizing operating variables BGi (i=1, 2, 3) is then used to predetermine control variables SGi (i=1, 2, 3) for the components of the internal combustion engine 1000 that react at different rates.

The internal combustion engine 1000 comprises as components for the modularized, temporally staggered, model-based predictive closed-loop control approach selected in this case: engine 200, which comprises a number of cylinders 201, and an injection system 500 that is allocated to the engine 200 and comprises a common rail 501, wherein injectors 502 are allocated to the number of cylinders 201 and each injector 502 is allocated an individual reservoir 503 that is provided so as to be charged with fuel from the common rail 501 for the injector 502. Furthermore, the internal combustion engine comprises as a component a gas and exhaust gas system for charging air LL and exhaust gas AG, in particular having an exhaust gas recirculation that is not illustrated explicitly here, wherein the gas and exhaust gas system 300 comprises a corresponding gas and exhaust gas path. Furthermore, the internal combustion engine 1000 comprises an exhaust gas aftertreatment 400 that is illustrated here with a diesel particulate filter DPP and a selective catalytic reactor SCR.

In accordance with the concept of the invention within the scope of this particularly preferred embodiment, it is provided to allocate the processes in the components of the engine 200 having the injection system 500, namely as a combustion-relevant component 111 and also the mass flow-relevant component 222 of the gas and exhaust gas path 300 and also the slowest component 333 relating to temperature changes of the exhaust gas aftertreatment system 400 to different process times and/or process scales; namely to the first more rapid process time t1 or to the second rapid somewhat slower process time t2 or to the slowest third process time t3 (in approximately t1=milliseconds, t2=seconds and t3=hours).

FIG. 2 illustrates for this purpose the above-mentioned timescale separation within the scope of the method for predictive open-loop control and/or closed-loop control of the internal combustion engine 1000 according to FIG. 1.

This model-predictive closed-loop control process that is illustrated in this figure renders it possible to take into account a non-linear model and is nevertheless capable of being performed on an engine control unit ECU in real time.

This is achieved by means of the skillful modularization of the non-linear model-based predictive closed-loop controller 10 that is schematically illustrated in FIG. 1, said closed-loop controller having corresponding closed-loop control processes 11, 12, 13 and the allocated predictive closed-loop control modules 1, 2, 3.

These are illustrated in FIG. 2 as closed-loop control processes 11, 12, 13 having the process times t1, t2, t3 (milliseconds, seconds, minutes or hours). As a measure for the process times t1, t2, t3, each closed-loop control process 11, 12, 13 is a corresponding time constant Ti and timescale Si (i=1, 2, 3), namely for the combustion-specific processes in the engine (closed-loop control module 1 having times/on a timescale/time constants t1, S1, T1), the gas-dynamic processes in the gas path (closed-loop control module 2, having times/on a timescale/time constants t2, S2, T2) and in the exhaust gas aftertreatment (closed-loop control module 3 having times/on a timescale/time constants t3, S3, T3).

Examples of the relevant control variables SGi, (i=1, 2, 3) and operating variables BGi, Gi (i=1, 2, 3) are illustrated in FIG. 2 for the individual closed-loop control modules 1, 2, 3. For the sake of simplicity, reference is made here to FIG. 2 with the specification of the corresponding desired and actual values for the operating variables BG1, G1 (M_Desired, n_Desired, PT_Desired, NOx_Desired_afterSCR) and control variables SG1 (p_Rail, BOI, m_ks), SG2 (u_TBP, u_Dr, u_AGR, u_SP) and also SG3 (Doser). Furthermore, FIG. 2 also shows the specification of specific boundary conditions (n_max_ATL_HD, n_max_ATL_ND, T_max_Desired, T_Desired, p_max) that are illustrated as boundary conditions 21 for the first closed-loop control module and boundary conditions (T7_Desired, NOx_Desired) that are provided as boundary conditions 22 for the second closed-loop control module.

Within the scope of this embodiment, the first and second closed-loop control module 1, 2 are combined for an engine management 4 that is coupled to a closed-loop control module 5 for the exhaust gas aftertreatment management. The coupling occurs here owing to the quasi-static specification from the third closed-loop control module 3; this by means of the operating parameters G3-Desired—in this case (temperature and NOx- and/or soot values prior to the exhaust gas aftertreatment).

The preferred embodiment that is proposed here provides that the combustion-characterizing rapid-running (t1) component of the first predictive closed-loop control module 1 can be taken into account as a static model by way of static polynomials (MPC-engine, model predictive controlled engine).

In relation to the component 4 that is illustrated in FIG. 2, it is possible to specify static models for the combustion variables, such as for example for the NOx values, soot values, torque values, T7 (Temperature AGN) and peak pressure. Further variables such as the rotational speeds for the exhaust gas turbocharger nATL_HD and nATL_ND can be described by means of polynomials or also other variants. In particular polynomials have as input values the measured engine variables as ACTUAL-values, the environmental conditions (T0, moisture, P0) and the control values of the combustion (BOI, injection quantity, rail pressure) and the ACTUAL-values of the subordinated gas path (for example lambda, AGR).

The characteristics of the modularization that is illustrated in FIG. 1 and FIG. 2 are also clear for the component 4 from the fact that the static combustion models and the model of the dynamic behavior of the gas path that is controlled in a closed-loop manner are evaluated. The term "a static combustion" is especially understood to mean: if the cylinder is closed, the result of the combustion is certain—namely, as a result of the current boundary conditions on the cylinder, it is possible to change the result of the combustion. It is possible by means of the description in the form of polynomials to depict the behavior of the combustion over the entire range of the input variables.

In this case, the output values of the slower closed-loop control module 2 also appear as quasi-static input values for the more rapid closed-loop control module 1. The polynomial model is coupled to the gas path closed-loop controller by way of a dynamic model for the behavior of the gas path that is controlled in a closed-loop manner, in other words by way of the influences of the exhaust gas recirculation rate and λ values or also other value pairs, namely in this case the desired values thereof. By means of specifying to the targets of the system: for example target value of emission, achieving desired torque/rotational speed, minimal consumption, limitations of actuators (for example injection pressure, injection quantity), limitations of inner engine variables that must be maintained (for example peak pressure, rotational speed of the turbocharger).

In relation to the gas path, the variables G can be taken into account in a non-static manner since said variables change over the temporal curve T2. However, it is possible to simplify the complexity using a replacement model of the closed-loop controlled gas path. The advantage resides in the fact that it is necessary for the optimization method to determine the desired values for the gas path but not directly the control variables for the gas path actuator. It is possible to describe the behavior of the closed-loop gas path by means of simple replacement models. The calculations of the optimization method are therefore simplified. The optimizer functions with the replacement model and it is not necessary to calculate a detailed model of the gas path (FIG. 3).

Figure 3:
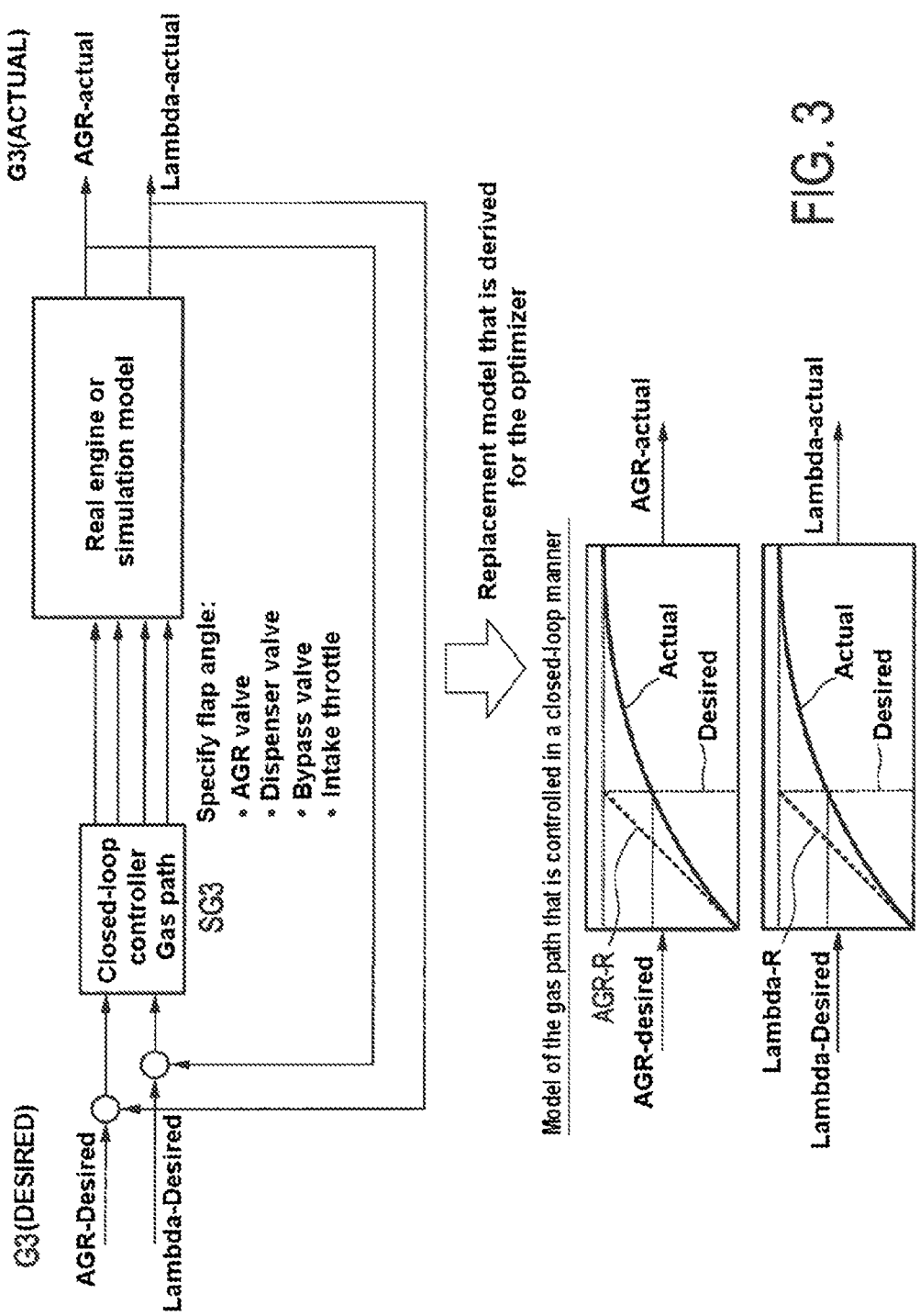
FIG. 3 illustrates schematically a replacement model for the model-based predictive closed-loop control module of the exhaust gas path.

In other words, the gas path can be described using a closed-loop control circuit that is illustrated subordinately in FIG. 3. The closed-loop controller that is illustrated in FIG. 3 provides the exhaust gas recirculation rate as desired values of characterizing variables and provides the Lambda value that is to be achieved as DESIRED-values. One or multiple of the exhaust gas recirculation valves, the dispenser valve, the bypass valve and the intake throttle by means of its flap angle are provided here as control variables. The control variables SG3 are adjusted in a closed-loop manner according to the difference between the DESIRED and ACTUAL values G3-DESIRED or G3-ACTUAL taking as a basis a simulation model of the real engine. The replacement model that is derived therefrom for an optimizer 31, 32 takes into account the curves of the exhaust gas recirculation rates that are illustrated in the lower part of FIG. 3 and the Lambda values and the model-based calculated values AGR-R or Lambda-R.

The gas path model of the engine is non-linear and in the simplest case comprises clearly more than ten states, by way of example fourteen states. It can already be provided here as a simplification that the dynamics of the valves are not taken into account individually in a dynamic manner and all the volumes are combined and also where possible static estimates are made. In this respect, the gas path that is controlled in a closed-loop manner and is illustrated in FIG.

3 reduces the model to a system having two states that can be described by means of decoupled non-linear systems. This results in a massive reduction of the computing outlay when calculating the optimal control variables. Moreover, there is the possibility for exchanging the closed-loop controller that is illustrated in FIG. 3 by means of a more complex closed-loop controller if this is required and is possible.

The static combustion models and the model of the dynamic behavior of the temperature dynamics are therefore evaluated in the module MPC AGN (component 5). Since the gas path closed-loop controller operates on a much slower timescale, its dynamics are ignored for this purpose with the result that said dynamics are taken into account as a boundary condition in the more rapid closed-loop control module 1. The solution that is achieved must fulfill an expanded form of the fundamental boundary conditions of the subordinated module MPC engine. A global solution to the large timescale of the AGN that fulfills all wishes however would be associated with a large computing outlay since for this purpose the large time interval would have to be taken into account using the fine temporal resolution of the smaller timescale of the gas path. The influence of the control variables on different timescales is taken into account on an individual basis by means of the timescale separation that is proposed in accordance with the concept of the invention. As a consequence, it is possible to perform a calculation in each case using the required temporal resolution and this is particularly efficient.

In a similar manner to the gas path, it is possible to control an exhaust gas aftertreatment in a closed-loop manner, in this case a selective catalytic reaction, by means of a corresponding typical closed-loop control circuit, as is illustrated in FIG. 2. The closed-loop control that is illustrated in FIG. 2 for the exhaust gas aftertreatment (SCR-controller) can be used in the module MPC AGN (component 5) for an efficiency adaptation ($\eta_{SCR} = \eta_{SCR} (T_{SCR}\ \dot{m}_{Exhaust\ gas})$) so as to minimize operating cost. It is possible for this purpose that the slower temperature dynamics are only taken into account in comparison to the much more rapid gas path dynamics. It appears that the environmental and boundary conditions in the individual modular predictive closed-loop control modules can be taken into account without a separate characteristic diagram structure being required.

All the environmental influences, such as external pressure, external temperature and air moisture are included in the stored part models of the closed-loop control modules. Consequently, it is possible for each component of the entire system to react properly to prevailing operating situations. Fundamentally, separate characteristic diagram structures are not required in order to determine the DESIRED-values G-DESIRED. The boundary conditions that are illustrated schematically in FIG. 1 also comprise model adaptations for adjusting deviations in the individual engines or engine aging conditions (reference numeral 21 in FIG. 1).

Figure 4:
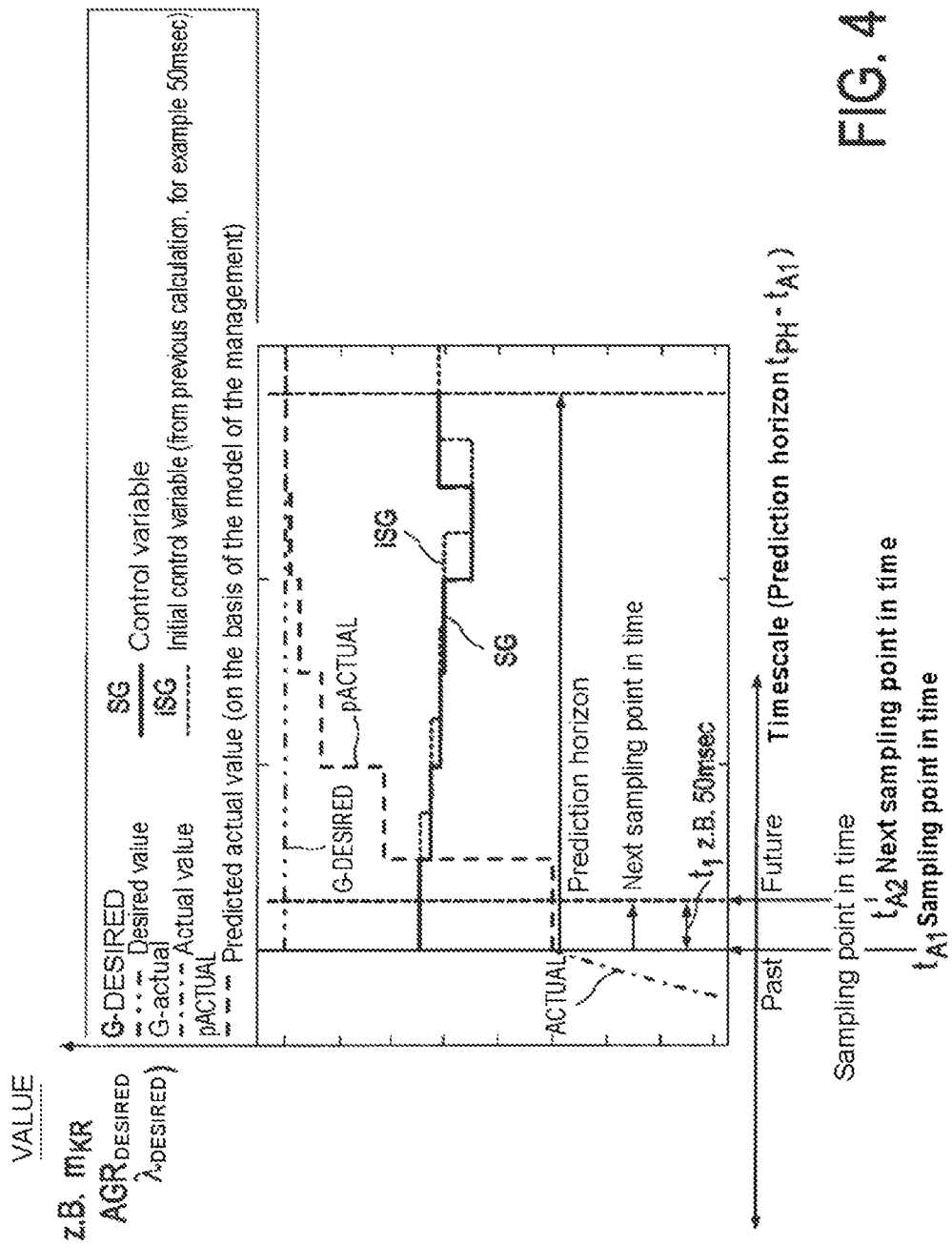
FIG. 4 illustrates the prediction horizon with desired and actual values for an exemplary control variable in the case of a model-predictive closed-loop control of FIG. 1.

A numerical optimization method is used in order to implement the closed-loop control structure that is proposed; this is used to determine which control variable curve can best achieve the requirements in the system that is controlled in a closed-loop manner in the prevailing operating situation; in particular in a predictive manner over a specific period of time that can stretch into the future (prediction horizon)—one example for a prediction in the case of the first closed-loop control module 1 is illustrated in FIG. 4, approximately for a mass flow in the engine or an exhaust gas recirculation rate or a λ-value that is referred to in the graphic in FIG. 4 with G.

Fundamentally, a best possible control variable is selected using the subordinated model with reference to optimization problems. The control variables SG, iSG is optimal over the prediction horizon and maintains the boundary conditions, in other words the, for example, predictive closed-loop control knows early on that the peak pressure threshold has been reached and takes this into account. As the main differences to the classic closed-loop controller, this results in an intuitive parameterization of the closed-loop control, to an ability to exchange the models and quality criteria and also auxiliary conditions and to explicitly taking into account limitations—a control variable can be optimal in relation to multiple sampling steps.

FIG. 5 lists in an exemplary manner the relevant states and variables for a model-based predictive closed-loop control that is illustrated in FIG. 2.

Figure 6:
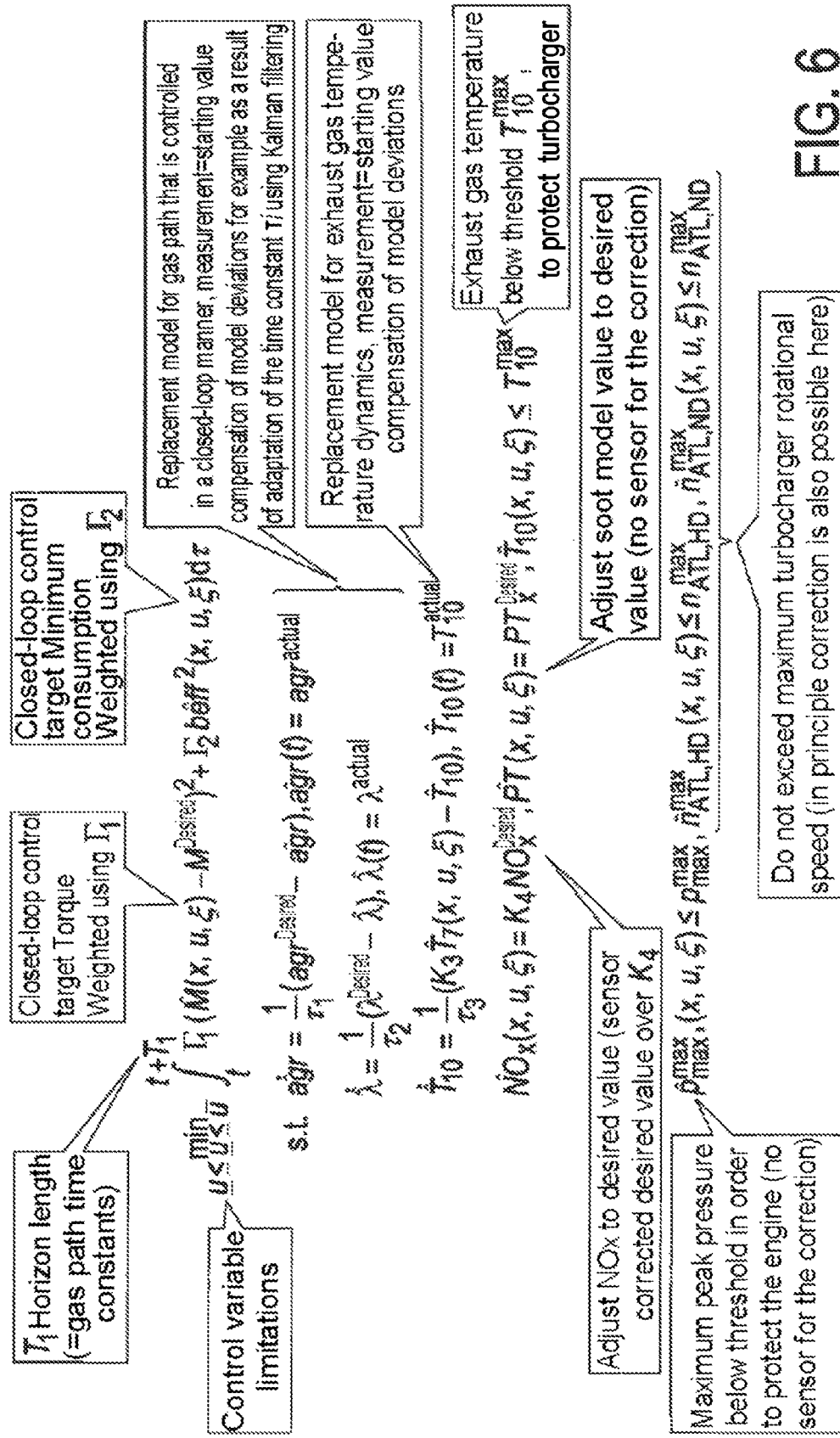
FIG. 6 illustrates an example of a measure of quality of a non-linear model-based predictive closed-loop control description for an internal combustion engine, here initially without an exhaust gas aftertreatment (selective catalytic reactor, SCR)

FIG. 6 illustrates the example of a measure of quality of a non-linear model-based predictive closed-loop control description for an internal combustion engine as an optimization problem in an integral form for the first closed-loop control module 1 (MPC engine) in combination with the gas path dynamics in the closed-loop control module 2—in other words the component 4.

FIG. 6A illustrates an example of the measure of quality of a non-linear model-based predictive closed-loop control description for a suitable closed-loop control module as a simplified integral problem and said example does not take into account the exhaust gas aftertreatment.

FIG. 6B illustrates an example of a coupling of the closed-loop control description of the FIG. 6A having a superordinate model-based predictive closed-loop control module of the engine in FIG. 6 and the optimization problem in the integral form again for the component 5.

FIG. 6C illustrates the example of a closed-loop control description for a model-based predictive closed-loop control approach for an engine having an exhaust gas aftertreatment taking into account in a holistic manner such as the example in FIG. 6B, however having a variation relating to the SCR.

Optimization problems of the form that are illustrated in FIG. 6 can be poorly conditioned with the result that despite the skillful modularization it is not possible to calculate the solution on the open-loop control device.

The auxiliary conditions are therefore weakened in so far as only safety relevant conditions such as for example the maximum peak pressure or the maximum turbo charger rotational speeds are maintained as inequality limitations. Non safety-relevant conditions such as for example soot or NOx values are softened, in other words said non safety-relevant conditions such as the torque over a heavy weight and a quadratic term are absorbed into the cost function, in other words for example in accordance with the principle of the minimized error quadratic for the NOx values.

This approach renders it possible for the optimizer to temporarily lie slightly above or below the desired value, which can be set using the weight. This is advantageous since the selected suboptimal MPC approach uses the last found control variable trajectory for the re-initialization procedure and in this manner results in an improvement in the solution as the time progresses. As a consequence, the optimizer always provides improvement potential and approaches the actual desired value as said optimizer would also do in the case of the torque. Without this softening, the initial control variable would always have had to result in exactly maintaining the desired value.

The hitherto proposed optimizing problems are to be understood as examples. Many other formulations are conceivable. For example, in lieu of the torque it is also possible to minimize a rotational speed deviation—in this case a rotational speed closed-loop controller in lieu of a torque closed-loop controller. It is possible for this purpose to use a comparatively complex load model estimation, wherein the estimator estimates the parameter rotational speed differential equation. It is then possible to better plan the resources since the desired torque is not provided by a superordinate PI-rotational speed closed-loop controller whose future torque requests are unknown. The closed-loop controller parameterization is provided primarily by means of weighting the closed-loop control targets.

As a further feedback variable there is the further possibility of adjusting the control variable limitations for the MPC blocks. If by way of example the gas path closed-loop controller identifies that the turbo bypass valve is no longer functioning, said gas path closed-loop controller relays to the MPC blocks in which regions it is still possible to vary λ. More generally, it is possible by way of modular structures and models to take into account online changes of the engine configuration by means of error/aging/etc. in the case of the closed-loop control if this is identified by a diagnostic process.

Furthermore, it is possible to take into account a bank shutdown in a module. It is thus possible for parallel models for both variants to calculate and to compute prevailing less effective variants in time intervals and also compare said variants with the prevailing more effective variants within the scope of a cost function and to switch to the more effective variant. In general, it is possible to take into account such behavior within the scope of polynomial models or other static models.

Alternatively, but a little more complex, a switch is performed in the system for the bank shutdown. The optimization is calculated with the prevailing configuration that is used and is compared at regular intervals with other model variants. If the costs (methods of the minimized deviation quadratics) for the other variants are less than those that are currently used, the switch is performed. If the required measuring variables are present, it is possible to adapt the used model to the real system behavior. The system can also take these changes into account during the prediction.

In summary, there are advantages for example when the turbocharger is switched, when the actuator dynamics are taken into account for example within the scope of a rail pressure model. In the case of the gas path that is controlled in a closed-loop manner, it is advantageously possible for example: to reduce the degrees of freedom, to reduce the number of control variables, to notify an improved possibility of possible physical thresholds and also to implement changes relating to model adaptations, aging, model deviations. The prediction provides possibilities of an easier transferability to other systems (petrol, gas or other engines and a reduced outlay when inputting data.

More complex, classic structures can in other words be replaced with the mentioned advantages by means of combined modules in accordance with the concept of the invention even without complex measurement in the case of the current models.

LIST OF REFERENCE NUMERALS

1000 Internal combustion engine
100 Device for predictive open-loop and/or closed-loop control
10 Model
200 Engine
300 Exhaust gas path/gas path
400 Exhaust gas aftertreatment system
500 Injection system
600 Drive train
11, 12, 13 Closed-loop controller
10 Predictive closed-loop controller
20 Conditions
30 Observer
21, 22, 23 Modularized condition specifications
31, 32, 33 Modularized observers
1, 2, 3 Predictive closed-loop control modules
t1, t2, t3, T, S Process times and/or process scales
1, 2, 3 Closed-loop control modules
G1, G2, G3 Characterizing variables
BG 1, BG 2, BG 3 Operating variables
SG 1, SG 2, SG 3 Control variables
LL Charging air
AG Exhaust gas
DPF Diesel particulate filter
111 combustion-relevant component
222 mass flow-relevant component
333 Temperature/aging-relevant component of the AGN
31, 32 Optimizer

The invention claimed is:

1. A method for predictive open-loop and/or closed-loop control of an internal combustion engine using control variables according to a model of the internal combustion engine, said model having characterizing variables, wherein in the method the control variables of the internal combustion engine are set in an open-loop controlled or a closed-loop controlled manner, the method comprising the steps of:

measuring actual values and specifying desired values of the characterizing variables of the internal combustion engine, and also optionally in dependence upon boundary conditions and/or environmental conditions and/or aging conditions;

controlling the actual values of the characterizing variables in a closed-loop manner according to a model of the internal combustion engine, said model having the desired values of the characterizing variables, wherein the closed-loop control is a model-based predictive closed-loop control in which the desired values of the characterizing variables of the model of the internal combustion engine are calculated and the control variables of the internal combustion engine are set in a predictive closed-loop control manner; and using a model-based predictive non-linear closed-loop controller for the closed-loop control, said controller being constructed in a modular manner using a number of model-based predictive closed-loop control modules, wherein at least one first model-based predictive closed-loop control module is allocated a first timescale, and at least one second model-based predictive closed-loop control module is allocated a second timescale, wherein the at least one first and at least one second timescale are different, wherein the first timescale is a more rapid process time and a shorter process scale when compared to the second timescale, and wherein the second timescale is a slower process time and a longer process scale when compared to the first timescale, wherein for gas and exhaust gas recirculation management a closed-loop control module for the gas and exhaust gas recirculation having a gas and exhaust gas path is combined with said first model-based predictive closed-loop control module, wherein a third timescale is allocated to said model-based predictive closed-loop control module for the gas and exhaust gas recirculation, wherein gas and exhaust gas path-characterizing variables of the gas and exhaust gas system are calculated for the gas and exhaust gas recirculation management, wherein variables of an exhaust gas recirculation are calculated for the gas and exhaust gas recirculation management, and wherein the variables calculated are an exhaust gas recirculation rate a position of one or more throttle valves, a position one or more dispenser valves and a rate of one or more turbine bypasses.

2. The method according to claim 1, wherein for calculation purposes, characterizing variables of the model of the internal combustion engine are calculated in real time on an engine control unit (ECU) for the entire internal combustion engine within the scope of a non-linear model-based predictive closed-loop control, and/or based on the model of the internal combustion engine, in particular the engine, desired values and control variables are determined for the first and/or the second closed-loop control module, said desired values and control variables being adjusted to a prevailing operating situation in terms of a measure of quality.

3. The method according to claim 1, including calculating the characterizing variables of the first closed-loop control module for the model of the internal combustion engine in the first model-based predictive closed-loop control module in dependence upon the calculation of characterizing variables of the second closed-loop control module for the model of the internal combustion engine in the second model-based predictive, closed-loop control module, and/or calculating the characterizing variables of the first closed-loop control module for the model of the internal combustion engine in the first model-based predictive closed-loop control module of a first timescale according to calculated characterizing variables of the second closed-loop control module for the model of the internal combustion engine in the second model-based predictive closed-loop control module of a second timescale.

4. The method according to claim 1, wherein for engine management, the first model-based predictive closed-loop control module of the first timescale is a closed-loop control module for the engine that comprises a number of cylinders, wherein combustion-characterizing variables of the engine are calculated.

5. The method according to claim 4, wherein the combustion-characterizing variables are NOx and/or soot value, and a Lambda value and/or an exhaust gas recirculation rate.

6. The method according to claim 1, wherein the first model-based predictive closed-loop control module of the first timescale comprises a closed-loop control module for an injection system that comprises a common rail, said injection system having a number of injectors that are allocated to cylinders of the engine, wherein an individual reservoir is allocated to an injector, said reservoir being provided so as to be charged with fuel from the common rail for the injector, wherein injection-characterizing variables of the injection system are calculated for injection management.

7. The method according to claim 6, wherein a start of an injection procedure, an end of an injection procedure and/or a rail pressure are calculated for injection management.

8. The method according to claim 2, including calculating an ignition point in time and/or a gas mass for a gas engine.

9. The method according to claim 1, wherein the third timescale is a mid-range process time and a medium to short process scale that is less than the first timescale and greater than the second timescale.

10. The method according to claim 1, wherein the second model-based predictive closed-loop control module of the second timescale is a closed-loop control module for exhaust gas aftertreatment having a catalytic converter, wherein exhaust gas aftertreatment-characterizing variables of the exhaust gas aftertreatment are calculated for exhaust gas aftertreatment management.

11. The method according to claim 10, wherein an exhaust gas temperature and/or catalytic converter temperature, a warming up/cooling down rate and/or a conversion rate are calculated as variables for the exhaust gas aftertreatment management.

12. The method according to claim 10, wherein variables of the exhaust gas aftertreatment are predetermined for the first closed-loop control module.

13. The method according to claim 12, wherein the variables of the exhaust gas aftertreatment are a gas and/or an exhaust gas temperature.

14. The method according to claim 12, wherein the variables of the exhaust gas aftertreatment are an emissions value of nitrogen oxides or other emissions values of the catalytic converter.

15. The method according to claim 1, wherein in the first model-based predictive closed-loop control module, in dependence upon the second, model-based predictive closed-loop control module, the following are taken into account:

boundary and/or environmental and/or aging conditions, of the characterizing variables of the internal combustion engine, and/or actual values and desired values, of the characterizing variables of the internal combustion engine, and/or estimations by non-linear observers, and/or an optimization algorithm.

16. The method according to claim 1, wherein the characterizing variables of the model of the internal combustion engine of the second, model-based predictive closed-loop control module of a second timescale are calculated dynamically and the characterizing variables of the model of the internal combustion engine of the first model-based predictive closed-loop control module of a first timescale are calculated statically.

17. The method according to claim 16, wherein the static calculation is performed using non-linear polynomials and the dynamic calculation is performed using a differential equation model.

18. The method according to claim 1, wherein the first timescale and/or the second timescale is significant for setting a temporal closed-loop control in accordance with one of the parameters selected from the group consisting of: a timescale of a closed-loop control time period, a time step of a closed-loop control interval, a sampling rate of a desired/actual value comparison, a computing cycle time of a closed-loop controller and other calculation rates, and a prediction horizon.

19. A device for predictive open-loop control and/or closed-loop control of an internal combustion engine, said device comprising: at least one first model-based predictive closed-loop control module; and a second, model-based predictive closed-loop control module; wherein the control modules are configured for engine management and/or injection management and/or gas and exhaust gas recirculation management and/or exhaust gas aftertreatment management, wherein the modules are embodied so as to implement the method according to claim 1, wherein an open-loop control characteristic diagram and/or a learning characteristic diagram is allocated to the first model-based predictive closed-loop control module or the second model-based predictive closed-loop control module.

20. An internal combustion engine, comprising a device for predictive open-loop control and/or closed-loop control of the internal combustion engine according to claim 12, including an engine control unit (ECU) for the entire internal combustion engine for open-loop control and/or closed-loop control, within a non-linear model-based predictive closed-loop control according to the model of the internal combustion engine, said model having characterizing variables, and according to the closed-loop control for the control variables, wherein the characterizing variables are controlled in a closed-loop manner according to a model of the internal combustion engine, said model having the characterizing variables, and according to the closed-loop control having the control variables, wherein the closed-loop control is performed within the scope of the model-based predictive closed-loop control in which the characterizing variables of the model of the internal combustion engine are calculated and the control variables of the internal combustion engine are set in a predictive closed-loop control manner, the engine control unit including the model-based predictive non-linear closed-loop controller for the closed-loop control, said controller being constructed in a modular manner using a number of model-based predictive closed-loop control modules including at least one first model-based predictive closed-loop control module that is allocated the first timescale, which is a more rapid process time and/or a shorter process scale when compared to the second timescale, and at least one second, model-based predictive closed-loop control module that is allocated the second timescale, which is a slower process time and/or a longer process scale when compared to the first timescale, wherein the first timescale and the second timescale are different.

21. The internal combustion engine according to claim 20, further comprising:

an engine having a number of cylinders;

an injection system having a common rail and a number of injectors that are allocated to the cylinders, wherein an individual reservoir is allocated to each injector, said reservoir being provided so as to be charged with fuel from the common rail for the injector, or a gas mixer and an ignition timing sensor;

a gas and exhaust gas recirculation system, having a gas and exhaust gas path; and an exhaust gas aftertreatment including a catalytic converter.

* * * * *